United States Patent [19]

Barry et al.

[11] Patent Number: 5,338,478
[45] Date of Patent: Aug. 16, 1994

[54] STABILIZED POLYETHER POLYOL AND POLYURETHANE FOAM OBTAINED THEREFROM

[75] Inventors: Lawrence B. Barry, Newington; Mark C. Richardson, Cheshire, both of Conn.

[73] Assignee: Uniroyal Chemical Company, Inc., Middlebury, Conn.

[21] Appl. No.: 97,698

[22] Filed: Jul. 27, 1993

Related U.S. Application Data

[62] Division of Ser. No. 37,058, Mar. 25, 1993, Pat. No. 5,256,333.

[51] Int. Cl.⁵ .................. C09K 3/00; C09K 15/32; C09K 15/08
[52] U.S. Cl. .................. 252/182.21; 252/182.29; 252/401; 252/404; 252/400.24; 521/107; 521/117; 521/128
[58] Field of Search .......... 252/182.27, 182.29, 252/401, 404, 400.24; 521/107, 117, 128

[56] References Cited

U.S. PATENT DOCUMENTS

| | | | |
|---|---|---|---|
| 2,834,748 | 5/1958 | Bailey et al. | 260/42 |
| 2,847,443 | 8/1958 | Hechenbleikner et al. | 260/461 |
| 3,280,049 | 10/1966 | Hyre et al. | 260/2.5 |
| 3,567,664 | 3/1971 | Haring | 260/2.5 |
| 3,637,865 | 1/1972 | Haring | 260/611.5 |
| 3,969,315 | 7/1976 | Beadle | 260/45.8 |
| 4,010,211 | 3/1977 | Preston et al. | 260/611.5 |
| 4,021,385 | 5/1977 | Austin et al. | 260/2.5 |
| 4,070,304 | 1/1978 | Hinze | 252/404 |
| 4,265,783 | 5/1981 | Hinze | 252/182 |
| 4,275,173 | 6/1981 | Hinze | 521/117 |
| 4,302,383 | 11/1981 | Valdiserri et al. | 260/45.8 |
| 4,305,866 | 12/1981 | York et al. | 260/45.7 |
| 4,692,539 | 9/1987 | Spivack | 558/78 |
| 4,794,126 | 12/1988 | Feeman et al. | 521/117 |
| 4,933,374 | 6/1990 | Suboza et al. | 521/117 |
| 5,077,321 | 12/1991 | Michaelis | 521/117 |

OTHER PUBLICATIONS

"The History and Trends of Phosphites in the Plastics Industry" by Janet D. Capolupo and Thomas C. Chucta.
"Rigid Plastics Foams" By T. H. Ferrigno.
Product Listing of GE Specialty Chemicals.

*Primary Examiner*—Morton Foelak
*Attorney, Agent, or Firm*—Jerome D. Drabiak

[57] ABSTRACT

A stabilizer composition useful as an additive for polyether polyols, particularly those employed in the manufacture of polyurethane foams, is provided which comprises a diarylamine, a sterically hindered phenol and a pentaerythritol diphosphite.

17 Claims, No Drawings

STABILIZED POLYETHER POLYOL AND POLYURETHANE FOAM OBTAINED THEREFROM

This is a division of application Ser. No. 08/037,058 filed Mar. 25, 1993 U.S. Pat. No. 5,256,333.

BACKGROUND OF THE INVENTION

This invention relates to a stabilizer composition, to a polyether polyol stabilized against degradation by the stabilizer composition and to a polyurethane foam obtained from the stabilized polyether polyol.

U.S. Pat. No. 3,280,049 discloses a stabilizer composition consisting of a sterically hindered phenol.

U.S. Pat. Nos. 3,567,664, 3,637,865, 4,010,211, 4,021,385, 4,070,304, 4,265,783 and 4,275,173 disclose stabilizer compositions consisting of mixtures of sterically hindered phenols with substituted diphenylamines.

U.S. Pat. No. 3,969,315 discloses a stabilizer composition consisting of a mixture of an alkyl phenyl propylene glycol phosphite and either a hindered phenol or an amine.

U.S. Pat. No. 4,794,126 discloses a stabilizer composition consisting of a mixture of a diaryl arylenediamine, a sterically hindered phenol and the reaction product of a diarylamine with a lower alkyl ketone.

U.S. Pat. No. 4,933,374 discloses a stabilizer composition derived from a mixture of 2,6-di-tert-butyl-4-sec-butylphenol and the reaction product of diisobutylene, styrene and diphenylamine and, optionally, trihydrocarbyl phosphite as color stabilizer.

U.S. Pat. No. 5,077,321 discloses a stabilizer composition consisting of a mixture of at least two compounds selected from a thiophenol, a diphenyl sulfide and a diphenylamine.

The use of various phosphites in stabilizer compositions is discussed in Capolupo et al., "The History and Trends of Phosphites in the Plastics Industry," in History of Polymeric Composites: Invited Papers Presented at the American Chemical Society Symposium on the Origin & Development of Polymeric Composites, Anaheim, Calif., Sept., 1986, ed. by R. B. Seymour & R. D. Deanin (1987). Tris(nonylphenyl)phosphite, distearyl pentaerythritol diphosphite, bis(2,4-di-t-butylphenyl)pentaerythritol diphosphite, and tris(2,3-di-t-butylphenyl)phosphite are disclosed, inter alia, as antioxidants useful in the manufacture of various plastics.

SUMMARY OF THE INVENTION

In accordance with the present invention, a stabilizer composition is provided which comprises:
a) a diarylamine;
b) a sterically hindered phenol; and,
c) a pentaerythritol diphosphite.

The foregoing stabilizer composition is especially useful as an additive for polyether polyols, particularly those employed in the manufacture of polyurethane foams where it further serves to prevent or reduce discoloration and scorching of the foamed products. This invention provides the following advantages over those currently in use:
a) reduced handling;
b) increased hydrolytic stability as compared to other liquid phosphites containing stabilizer systems;
c) reduced processing time due to elimination of filtration step;
d) increased color stability of stabilizer composition due to addition of phosphite.

DESCRIPTION OF THE PREFERRED EMBODIMENTS

The diarylamines, hindered phenols and pentaerythritol diphosphites that are employed in the stabilizer composition of this invention are individually well known compounds.

Suitable diarylamines that can be employed in the liquid stabilizer composition herein include diphenylamine, p,p'-di-tertoctyldiphenylamine, p,p'-di-α-phenylethyldiphenylamine, p-tert-octyl-p'-phenylethyldiphenylamine, p-tert-octyldiphenylamine, p-phenylethyldiphenylamine, tri-t-octyldiphenylamine, p-tert-butyldiphenylamine, p,p'-di-tert-butyldiphenylamine, p-tert-octyl-p'-butyldiphenylamine, p-tert-butyl-p'-phenylethyldiphenylamine, phenyl-betadiphenylamine, the ditolylamines, the phenyltolylamines, the dinaphthylamines, dianilinodiphenylmethane, p-hydroxyldiphenylamine, p-amino-diphenylamine, N,N'-diphenyl-p-phenylenediamine, p-chlorodiphenylamine, p-isopropoxydiphenylamine and the like. A mixture of alkylated diphenylamines comprising butylated and octylated species can be obtained by reacting isobutylene with diphenylamine. This mixture, which is preferred, is commercially available under the tradename Naugard PS-30 (Uniroyal Chemical Co.).

The diarylamine component of the stabilizer composition of this invention can be present therein in widely varying amounts, e.g., from about 10 to about 90, preferably from about 20 to about 60, and most preferably from about 30 to about 50, weight percent based on the entire weight of stabilizer composition.

Suitable hindered phenols that can be utilized in the liquid stabilizer composition herein include 2,4-dimethyl-6-octylphenol, 2,6-di-t-butyl-4-methylphenol, 2,6-di-t-butyl-4-nonylphenol, 2,6-di-t-butyl-4-ethylphenol, 2,6-di-t-butyl-4-n-butylphenol, 2,6-di-t-butyl-4-sec-butylphenol, 2,2'-methylenebis(4-methyl-6-t-butylphenol), 2,2'-methylenebis(4-ethyl-6-t-butylphenol), 2,4-dimethyl-6-t-butylphenol, 4-hydroxymethyl-2,6-di-t-butylphenol, n-octadecyl-$\beta$(3,5 di-t-butyl-4-hydroxyphenyl)-propionate, 4,4'-dihydroxydiphenol, 4,4'-thiobis(6-t-butyl-o-cresol), p-butylphenol, p-isopropylphenol, p-(1,1,3,3-tetramethylbutyl)phenol, thymol, mixed m- and p-cresol, p-nonylphenol, other phenols, cresols having alkyl substituents and mixtures thereof. A preferred hindered phenol is 2,6-di-t-butyl-4-sec-butylphenol, which is commercially available under the tradenames Isonox 132 (Schenectady Chemical Co.) and Vanox 1320 (R. T. Vanderbilt Co.).

The hindered phenol component of the stabilizer composition of this invention can be present therein in widely varying amounts, e.g., from about 10 to about 90, preferably from about 40 to about 80, and most preferably from about 50 to about 70, weight percent based on the entire weight of stabilizer composition.

The pentaerythritol diphosphites that can be utilized in the stabilizer composition herein are preferably the sterically hindered bis(aryl)pentaery-thritol diphosphites, numerous examples of which are known in the art, e.g., as disclosed in U.S. Pat. Nos. 2,847,443, 4,302,383, 4,305,866 and 4,692,539. Of these preferred diphosphites, those in which the aryl groups are substituted with branched alkyl groups of from about 3 to about 30 carbon atoms are particularly preferred. The aryl groups are preferably phenyl groups and contain branched alkyl groups in the 2 and 4 positions relative to one another on the phenyl ring. An especially preferred pentaerythritol diphosphite for use herein is bis(2,4-di-t-butylphenyl)pentaerythritol diphosphite (referred to herein as BPD), which is available under the tradename Ultranox 626 (General Electric Specialty Chemicals). This compound contains approximately 1 weight percent of triisopropanolamine to add hydrolytic stability to the diphosphite.

BPD is a high performance solid organophosphate antioxidant which is known for its stabilization of polyolefins, polyesters, styrenes, engineering thermoplastics, polyvinyl chlorides, elastomers and adhesives. BPD is known to exhibit superior stability compared to other phosphite compositions currently employed in the manufacture of polyurethane foams and other polymeric materials. Examples of such currently employed phosphites are tris (nonylphenyl) phosphite, phenyl diisodecyl phosphite, tris(2,4-di-t-butylphenyl)phosphite, tridecyl phosphite and triisooctyl phosphite.

Of the three components of the stabilizer composition herein, the pentaerythritol diphosphite component will generally be present in the lowest amount, e.g., from about 0.1 to about 10, preferably from about 1 to about 8, and most preferably from about 3 to about 5, weight percent based on the entire weight of stabilizer composition.

As previously indicated, the stabilizer composition of this invention is particularly useful for the stabilization of polyether polyols, primarily from degradation resulting from oxidation. The polyether polyols are well known in the art and are obtained by reacting polyhydric alcohols, e.g., those containing from 2–8 hydroxyl groups such as ethylene glycol, propylene glycol, diethylene glycol, 2,3-butylene glycol, 1,3-butylene glycol, 1,5-pentane diol, glycerol, trimethylolpropane, triethylolpropane, sorbitol, pentaerythritol, and mixtures thereof, with a 1,2-epoxide, e.g., ethylene oxide, propylene oxide, butylene oxide, cyclohexane oxide, glycidol and the halogenated alkylene oxides such as 4,4,4-trichloro-1,2-epoxybutane, and mixtures thereof. The preferred polyether polyols contain from 2–4 hydroxyl groups and are obtained by reacting one or more polyhydric alcohols having a like number of hydroxyl groups with ethylene oxide, propylene oxide, butylene oxide, and mixtures thereof.

The stabilizer composition is added to the polyether polyol in an amount sufficient to impart an appreciable stabilizing effect. In general, this amount may vary from about 0.1 to about 2 weight percent, preferably from about 0.2 to about 1 weight percent and most preferably from about 0.4 to about 0.6 weight percent by total weight of polyether polyol(s). Where the polyether polyol is to be employed in the manufacture of a polyurethane foam and stabilization of the polyol is not in issue, the stabilizer composition may be added to some other component of the polyurethane-forming reaction mixture, e.g., to the polyisocyanate, prepolymer, foaming agent, etc., or to the reaction mixture once formed, rather than to the polyol. In this case, the foregoing amounts of stabilizer composition calculated on the basis of the total polyether polyol component can be utilized.

Any suitable organic isocyanate which is capable of reacting with a polyether polyol to form a polyurethane can be employed in preparing the foam. This includes diisocyanates and polyisocyanates, e.g., triisocyanates and polymeric isocyanates. Due to their commercial availability, the polymeric isocyanates and tolylene diisocyanate are preferred. The latter, the use of which is more preferred, can be supplied in the form of an isomeric mixture of about 80 weight percent of 2,4-isomer and about 20 weight percent of 2,6-isomer. Other typical isocyanates include 4,4'-methylene-bis(phenylisocyanate), 3,3'-bitolylene-4,4'-diisocyanate, 3,3'-dimethoxy-biphenylene-4,4'-diisocyanate, naphthalene-1,5-diisocyanate, hexamethylene diisocyanate, 1,4-phenylene diisocyanate, polyphenylene polymethylene isocyanate, etc. The amount of isocyanate employed in the preparation of the polyurethane foams should be sufficient to provide at least about 0.7 NCO groups per hydroxyl group present in the reaction system. An excess of isocyanate compound can be conveniently employed; however, the use of a large excess is generally undesirable due to the high cost of the isocyanate compounds. It is preferable, therefore, to employ no greater than about 1.5 NCO groups per hydroxyl group, and still more preferably from about 0.9 to about 1.3 NCO groups per hydroxyl group.

In preparing the polyurethane foams, the polyether polyol is reacted with the organic isocyanate in the presence of a foaming agent and a reaction catalyst. The foaming agent can be any one of those known to be useful for this purpose, such as water, which is preferred, the halogenated hydrocarbons and mixtures thereof. Typical halogenated hydrocarbons include monofluorotrichloromethane, difluorodichloromethane, 1,1,2-trichloro-1,2,2-trifluoroethane, methylene chloride, etc. The amount of foaming agent employed can be varied within a wide range. Generally, however, the halogenated hydrocarbons are employed in an amount from about 1 to about 50 parts by weight per 100 parts by weight of the polyether polyol, and generally water is employed in an amount of from about 0.1 to about 10 parts by weight per 100 parts by weight of the polyether polyol.

The catalyst used in preparing the polyurethane foams can be any one of those known to be useful for this purpose or mixtures thereof, including tertiary amines and metallic salts. Typical tertiary amines include N-methyl morpholine, N-hydroxyethyl morpholine, triethylene diamine, dimethyl ethanolamine, tetramethylbutane diamine, trimethylamine, triethylamine, etc. Typical metallic salts include the salts of antimony, tin and iron, e.g., dibutyltin dilaurate, stannous octoate, etc. Generally speaking, the catalyst is employed in an amount ranging from about 0.1 to about 2.0 weight percent based on the weight of the polyether polyol.

It is preferred in the preparation of the polyurethane foams of the present invention to employ minor amounts of a surfactant in order to improve the cell structure of the polyurethane foams. Typical of such surfactants are the silicon-based surfactants as disclosed, e.g., in U.S. Pat. No. 2,834,748 and in the book "Rigid Plastic Foams" by T. H. Ferrigno (1963), Reinhold Publishing Company. Other suitable compounds useful as surfactants include synthetic detergents such as oxyethylated nonyl phenol and other ethylene oxide and glycidol-based surfactants. Generally up to about 2 pads by weight of the surfactant is employed per 100 parts by weight of polyether polyol.

Various additives can also be employed in preparing the foam which serve to provide different properties. Fillers, e.g., clay, calcium sulfate, barium sulfate, ammonium phosphate, etc., can be added to lower cost and improve physical properties. Dyes can be added for color and fibrous glass, asbestos, or synthetic fibers can be added for strength. In addition, plasticizer, deodorants and flame retardants can be added.

The following examples are illustrative of the invention.

EXAMPLE 1

This example illustrates the preparation of a stabilizer composition in accordance with the invention.

2,6-di-t-butyl 4-sec-butylphenol (1,914 g; Isonox 132), a mixture of butylated and octylated diphenylamines (1,254 g; Naugard PS30) and bis(2,4-di-t-butylphenyl)-pentaerythritol diphosphite (BPD) (132 g; Ultranox 626) were placed in a 5-liter glass beaker and mixed using a 3-inch stirring bar on a magnetic stirring hot plate. The beaker was covered with aluminum foil to minimize oxidation. Inert nitrogen was bubbled into the mixture which was then heated to 90° C. over a 30 minute period. The mixture was heated at 90° C. for 2 hours.

In subsequent batches, BPD was stirred into the 2,6-di-t-butyl 4-sec-butylphenol and the butylated and octylated diphenylamine mixture was thereafter added. The composition was thereafter hand-mixed with a spatula and allowed to stand for approximately 1 hour prior to heating. The mixture became a clear solution at about 80° C.

EXAMPLE 2

In three separate trials, three polyurethane foam-forming reaction mixtures (A through C) were prepared using the materials listed in Table I below. Each reaction mixture employed a 3000 g/mol. average molecular weight polyether polyol, i.e., Polyol 16-52 (AC West Virginia), which had been minimally stabilized against oxidative degradation with 100 ppm butylated hydroxy toluene. The three reaction mixtures differ principally in the amount of foaming agent, i.e., water, and toluene diisocyanate present therein.

TABLE I

| POLYURETHANE FOAM-FORMING REACTION MIXTURES | | | |
|---|---|---|---|
| Reaction Mixture | A | B | C |
| Polyol 16-52 (g) | 200 | 200 | 200 |
| Water (parts by weight of polyol) | 8.0 | 10.0 | 11.0 |
| Niax A-1 Amine Catalyst (g) | 0.06 | 0.06 | 0.14 |
| L-620 Surfactant (g) | 2.0 | 2.0 | 2.4 |
| FR Thermolin 101 (g) | 14.0 | 14.0 | 14.0 |
| T-9 Tin Catalyst (g) | 0.36 | 0.46 | 0.50 |
| Toluene diisocyanate (g) (80:20 isomer mixture) | 108.9 | 131.2 | 142.3 |
| Isocyanate Index | 115 | 115 | 115 |

To prepare each of the foregoing reaction mixtures, a premix containing water, Niax A-1 amine catalyst (Union Carbide Co.) and L-620 silicone surfactant (Union Carbide Co.) was added to a mixture containing 200 g of the polyether polyol, FR Thermolin 101 as fire retardant (Olin Corp.) and one of the five stabilizer compositions of Table II set forth below.

TABLE II

| STABILIZER COMPOSITIONS | | | | | |
|---|---|---|---|---|---|
| Stabilizer Composition (SC) | SC-1 | SC-2 | SC-3 | SC-4 | SC-5 |
| Naugard 445, 4,4'-di-(α,α-dimethylbenzyl) diphenylamine, ppm | 1900 | 2000 | | | |
| Butylated hydroxytoluene, hindered phenol, ppm | 2600 | 3000 | | | |
| Naugard PS-30 ppm | | | 1900 | 1900 | 1800 |
| Isonox 132 2,6-di-t-butyl-4-sec-butylphenol, ppm | | | 2900 | 2900 | 2800 |
| Ultranox 626 bis(2,4-di-t-butylphenyl) pentaerythritol diphosphite, ppm | | | | 200 | 400 |
| Naugard R, paraphenylene diamine, ppm | | | 200 | | |

The FR Thermolin 101 was added to the polyol prior to adding other formulation ingredients. T-9 tin catalyst (Air Products Corp.) was then added to the composition and mixed in a high speed lightning mixer for 5 seconds. The final ingredient, toluene diisocyanate (a 20:80 weight percent mixture of the 2,4-isomer and 2,6 isomer supplied by Mobay Corp.), was thereafter added. The mixture was stirred at high speed for 7 additional seconds and then poured into a 10"×10"×5" cardboard container. The foam was allowed to rise completely at room temperature and then allowed to stand for 5 additional minutes.

Stabilizer Compositions 1 (SC-1), 2 (SC-2) and 3(SC-3) represent known stabilizer compositions. Stabilizer Compositions 4 (SC-4) and 5 (SC-5) represent stabilizer compositions in accordance with the present invention.

In this manner, 15 samples of polyurethane foam were obtained for evaluation, i.e., the Reaction Mixtures A, B and C of Table I containing each of the five Stabilizer Compositions SC-1 to SC-5 of Table II.

EXAMPLE 3

Scorch resistance of the 15 polyurethane foams of Example 2 was determined by the microwave scorch test in the following manner: the sides of the cardboard container were removed and the foam specimen was cured in a microwave oven for 17.5 minutes at the 20 percent power setting. The foam was then air cured in an air circulating oven for 3 minutes at 125° C. immediately after the microwave curing step. After removal from the air circulating oven, the foam was cut in half horizontally to the rise of the foam and analyzed for degree of scorch and color using the HunterLab Colorimeter Model D25M/L. A numerical value was assigned to the color of each foam sample. Three color characteristics, i.e., redness/greenness (a), yellowness/blueness (b)and lightness (L), of the foam were measured and compared to a white tile standard. Using these values, Hunter Color $\Delta E$, or total color difference, was calculated according to the following equation:

$$\Delta E = (\Delta L^2 = \Delta a^2 \times \Delta b^2)^{\frac{1}{2}}$$

Table III below sets forth the Hunter Color $\Delta E$ and (b) values for foams prepared using the various stabilizer systems described in detail above.

TABLE III

| MICROWAVE SCORCH TEST DATA | | | |
|---|---|---|---|
| Stabilizer Composition | Reaction Mixture | | |
| | A | B | C |
| | Hunter Color $\Delta E$ values | | |
| SC-1 | 43 | 33 | 31 |
| SC-2 | 38 | 33 | 30 |

TABLE III-continued

MICROWAVE SCORCH TEST DATA

| Stabilizer Composition | Reaction Mixture | | |
|---|---|---|---|
| | A | B | C |
| SC-3 | 37 | 38 | 34 |
| SC-3 | 34 | 39 | 35 |
| SC-5 | 43 | 36 | 39 |
| Hunter Color (b) values | | | |
| SC-1 | 23.3 | 24.6 | 23.8 |
| SC-2 | 23.6 | 24.1 | 22.5 |
| SC-3 | 23.2 | 23.0 | 23.5 |
| SC-4 | 21.5 | 24.0 | 24.0 |
| SC-5 | 23.1 | 23.0 | 23.5 |

The above results demonstrate that for Reaction Mixture A, Stabilizer Composition 4 provided the highest degree of scorch protection when comparing the Hunter Color ΔE and (b) values of the various Stabilizer Compositions.

EXAMPLE 4

The data for the degree of scorch protection provided by the stabilizer compositions were obtained by visual measurement, the results being set forth in Table IV below. The scorch protection afforded by each of the stabilizer compositions was scaled from 1 to 10 with 1 being the best, and 10 being the worst, degree of scorch protection.

TABLE IV

MICROWAVE SCORCH TESTING OF POLYURETHANE FOAM (INDUSTRY SCALE 1-10)

| Stabilizer Composition | Reaction Mixture | | |
|---|---|---|---|
| | A | B | C |
| SC-1 | 3.2 | 3.0 | 2.2 |
| SC-2 | 3.0 | 2.2 | 2.0 |
| SC-3 | 3.0 | 3.0 | 2.1 |
| SC-4 | 2.1 | 3.0 | 2.1 |
| SC-5 | 3.2 | 2.2 | 3.0 |

These results clearly indicate that SC-4 provides greater scorch protection relative to the known stabilizer compositions, i.e., SC-1, SC-2 and SC-3, for the foams produced from Reaction Mixture A. In the foams produced from Reaction Mixture B, SC-5 provided the greatest degree of scorch protection and SC-4 performed at least as effectively as the known stabilizer compositions SC-1 and SC-3. In the foams produced from Reaction Mixture C, SC-4 performed comparably to the known stabilizer compositions.

EXAMPLES 5-6 and COMPARATIVE EXAMPLES 1-6

To determine the effect of phosphites on the performance of polyol stabilizer compositions, various phosphites were mixed with butylated hydroxy toluene and styrenated diphenylamine and tested as stabilizer compositions for polyether polyols. Polyurethane foams manufactured in part from the polyether polyols stabilized with these phosphite-containing stabilizer compositions were subjected to the microwave scorch test as discussed in Example 3 and examined for degree of scorch.

The polyether polyol possessed an average molecular weight of 3000 g/tool and was minimally stabilized with 100 ppm butylated hydroxy toluene (Dow Voranol 3137). Eight 200 gram samples of the polyether polyol were individually stabilized with the antioxidant compositions presented in Table V below. Examples 5 and 6 represent the stabilizer composition of this invention. Comparative Example 1 contains no phosphite and Comparative Examples 2-6 contain standard phosphites. The stabilized polyol was added to a premix containing water (100 g), A-1 catalyst (0.20 g; Union Carbide) and L-5810 silicone surfactant (2.0 g; Union Carbide). The mixture was stirred in a lightning mixer for 5 seconds at high speed. T-10 catalyst (0.40 g; a mixture of stannous octoate and dioctyl phthalate from Air Products Corp.) was then added and the resulting mixture was stirred for 5 seconds in the lightning mixer. Toluene diisocyanate (126.0 g; an 80:20 weight percent mixture of the 2,6-isomer and 2,4-isomer supplied by Mobay Corp.) was added and the mixture was again stirred at high speed for 7 additional seconds. The mixture was thereafter poured into a 10"×10"×5" cardboard container and the resulting foam was allowed to rise completely.

After the foam rose completely at room temperature, it was allowed to stand for 5 additional minutes. The sides of the cardboard container were then removed and the sample was cured in a microwave oven for 5 minutes and 38 seconds at 50 percent power. Immediately thereafter, the sample was oven cured for 3 minutes at 125° C.

The specimens were cut in half, horizontally to the rise of the foam, and analyzed for degree of scorch. The performance ratings are based on a scale of 1-10 with 1 representing the best scorch protection and 10 being the worst. The data are presented in Table V below:

TABLE V

SCORCH PROTECTION PROVIDED BY PHOSPHITE-CONTAINING STABILIZER COMPOSITIONS

| Example | Naugard BHT (ppm) (hindered phenol) | Wingstay 29 (ppm) (styrenated diphenylamine) | Ultranox 626 (ppm) (bis(2,4-di-t-butylphenyl) pentaerythritol diphosphite) | Wytox 312 (ppm) (tris (nonylphenyl) di-phosphite) | Weston TDP (ppm) (tridecyl phosphite) | Performance |
|---|---|---|---|---|---|---|
| 5 | 4000 | 900 | 100 | — | — | 1-2 |
| 6 | 4000 | 800 | 200 | — | — | 1 |
| Comp. Ex. 1 | 4000 | 1000 | — | — | — | 2 |
| Comp. Ex. 2 | 4000 | 900 | — | 100 | — | 2 |
| Comp. Ex. 3 | 4000 | 900 | — | — | 100 | 1-2 |
| Comp. Ex. 4 | 4000 | 800 | — | 200 | — | 2 |
| Comp. Ex. 5 | 4000 | 800 | — | — | 200 | 1-2 |
| Comp. Ex. 6 | 4000 | 1000 | — | — | 200 | 1-2 |

The above data show that the stabilizer composition containing the pentaerythritol diphosphite (Examples 5 and 6) performed as good as or better than the stabilizer compositions of the Comparative Examples 1-6.

What is claimed is:

1. A polyether polyol stabilized against degradation by the inclusion therein of a stabilizing amount of a liquid stabilizer composition comprising:
   a) a diarylamine;
   b) a hindered phenol; and,
   c) a pentaerythritol disphosphite.

2. The polyether polyol of claim 1 wherein in the liquid stabilizer, the diarylamine is present at a level of from about 10 to about 90 weight percent, the hindered phenol is present at a level of from about 10 to about 90 weight percent and the pentaerythritol diphosphite is present at a level of from about 0.1 to about 10 weight percent.

3. The polyether polyol of claim 1 wherein in the liquid stabilizer composition, the diarylamine is present at a level of from about 20 to about 60 weight percent, the hindered phenol is present at a level of from about 40 to about 80 weight percent and the pentaerythritol diphosphite is present at a level of from about 1 to 8 weight percent.

4. The polyether polyol of claim 1 wherein the liquid stabilizer composition, the diarylamine is selected from the group consisting of diphenylamine, p,p'-di-tert-octyldiphenylamine, p,p'-di-α-phenylethyldiphenylamine, p-tert-octyl-p'-phenylethyl-diphenylamine, p-tert-octyldiphenylamine, p-phenylethyldiphenylamine, tri-t-octyldiphenylamine, p-tert-butyldiphenylamine, p,p'-di-tert-butyldiphenylamine, p-tert-octyl-p'-butyldiphenylamine, p-tert-butyl-p'-phenylethyldiphenylamine, phenyl-beta-diphenylamine, the ditolylamines, the phenyltolylamines, the dinaphthylamines, dianilinodiphenyl-methane, p-hydroxyldiphenylamine, p-amino-diphenylamine, N,N'-diphenyl-p-phenylenediamine, p-chlorodiphenylamine, p-isopropoxydiphenylamine and mixtures thereof.

5. The polyether polyol of claim 1 wherein in the liquid stabilizer composition, the hindered phenol is selected from the group consisting of 2,4-dimethyl-6-octylphenol, 2,6-di-t-butyl-4-methylphenol, 2,6-di-t-butyl-4-nonylphenol, 2,6di-t-butyl-4-n-butylphenol, 2,6-di-t-butyl-4-ethylphenol, 2,6di-t-butyl-4-sec-butylphenol, 2,2'-methylenebis(4-methyl-6-t-butylphenol), 2,2'-methylenebis(4-ethyl-6-t-butylphenol), 2,4-dimethyl- 6-t-butylphenol, 4-hydroxymethyl-2,6-di-t-butylphenol, n-octadecyl-β(3,5 di-t-butyl-4-hydroxyphenyl) propionate, 4 4'-dihydroxydiphenol, 4,4'-thiobis(6-t-butyl-o-cresol), p-butylphenol, p-isopropylphenol, p-(1,1,3,3-tetramethylbutyl)phenol, thymol, mixed m- and p-cresol, p-nonylphenol and mixtures thereof.

6. The polyether polyol of claim 1 wherein in the liquid stabilizer composition, the pentaerythritol diphosphite is a bis(aryl) pentaerythritol diphosphite.

7. The polyether polyol of claim 6 wherein the liquid stabilizer composition, the aryl group of the pentaerythritol diphosphite is a phenyl group containing at least 2 branched alkyl groups of from about 3 to about 30 carbon atoms.

8. The polyether polyol of claim 1 wherein in the liquid stabilizer composition, the pentaerythritol diphosphite is bis(2,4-di-t butylphenyl)pentaerythritol diphosphite.

9. The liquid stabilizer of claim 1 wherein in the liquid stabilizer composition, the diarylamine is selected from the group consisting of diphenylamine, p,p'-di-tert-octyldiphenylamine, p,p'-di-α-phenylethyldiphenylamine, p-tert-octyl-p'-phenylethyl-diphenylamine, p-tert-octyldiphenylamine, p-phenylethyldiphenylamine, tri-t-octyldiphenylamine, p-tert-butyldiphenylamine, p,p'- di-tert-butyldiphenylamine, p-tert-octyl-p'-butyldiphenylamine, p-tert-butyl-p'-phenylethyldiphenylamine, phenyl-beta-diphenylamine, the ditolylamines, the phenyltolylamines, the dinaphthylamines, dianilinodiphenylmethane, p-hydroxyldiphenylamine, p-amino-diphenylamine, N,N'-diphenyl-p-phenylenediamine, p-chlorodiphenylamine, p-isopropoxydiphenylamine, and mixtures thereof, the hindered phenol is selected from the group consisting of 2,4-dimethyl-6-octylphenol, 2,6-di-t-butyl-4-methylphenol, 2,6-di-t-butyl-4-nonylphenol, 2,6-di-t-butyl-4-n-butylphenol, 2,6-di-t-butyl-4-ethylphenol, 2,6-di-t-butyl-4-sec-butylphenol, 2,2'-methylenebis(4-methyl-6-t-butylphenol), 2,2'-methylenebis(4-ethyl-6-t-butylphenol), 2,4-dimethyl-6-t-butylphenol, 4-hydroxymethyl-2,6-di-t-butylphenol, n-octadecyl-β(3,5 di-t-butyl-4-hydroxyphenyl)propionate, 4,4'-dihydroxydiphenol, 4,4'-thiobis(6-t-butyl-o-cresol), p-butylphenol, p-isopropylphenol, p-(1,1,3,3-tetramethylbutyl)phenol, thymol, mixed m- and p-cresol, p-nonylphenol, and mixtures thereof and the pentaerythritol diphosphite is a bis(aryl)pentaerythritol diphosphite.

10. The polyether polyol of claim 9 wherein in the liquid stabilizer composition, the aryl group is a phenyl group containing at least two branched alkyl groups of from 3 to about 30 carbon atoms.

11. The polyether polyol of claim 9 wherein in the liquid stabilizer composition, the bis(aryl)pentaerythritol diphosphite is bis(2,4-di-t-butylphenyl)pentaerythritol diphosphite.

12. The polyether polyol of claim 9 wherein in the liquid stabilizer composition, the diarylamine is present at a level of from about 10 to about 90 weight percent, the hindered phenol is present at a level of from about 10 to about 90 weight percent and the pentaerythritol diphosphite is present at a level of from about 0.1 to about 10 weight percent.

13. The polyether polyol of claim 9 wherein in the liquid stabilizer composition, the diarylamine is present at a level of from about 20 to about 60 weight percent, the hindered phenol is present at a level of from about 40 to about 80 weight percent and the pentaerythritol diphosphite is present at a level of from about 1 to about 8 weight percent.

14. The polyether polyol of claim 9 wherein in the liquid stabilizer composition, the diarylamine is a mixture of butylated diphenylamine and octylated diphenylamine present at a level of from about 20 to about 60 weight percent, the hindered phenol is 2,6-di-t-butyl-4-sec-butylphenol present at a level of from about 40 to about 80 weight percent and the pentaerythritol diphosphite is bis(2,4-di-t-butylphenyl) pentaerythritol diphosphite present at a level of from about 1 to about 8 weight percent.

15. The polyether polyol of claim 1 wherein the liquid stabilizer composition is present therein in an amount of from about 0.1 to about 2 weight percent by total weight of the polyether polyol.

16. The polyether polyol of claim 1 wherein the liquid stabilizer composition is present therein in an amount of from about 0.2 to about 1 weight percent by total weight of polyether polyol.

17. The polyether polyol of claim 1 wherein the liquid stabilizer composition is present therein in an amount of from about 0.4 to about 0.6 weight percent by total weight of the polyether polyol.

* * * * *